United States Patent [19]

Rinehart

[11] 4,015,045

[45] Mar. 29, 1977

[54] CHEMICAL STRENGTHENING OF GLASS

[75] Inventor: Dale W. Rinehart, Natrona Heights, Pa.

[73] Assignee: PPG Industries, Inc., Pittsburgh, Pa.

[22] Filed: Aug. 15, 1975

[21] Appl. No.: 605,108

Related U.S. Application Data

[63] Continuation-in-part of Ser. No. 432,006, Jan. 9, 1974, abandoned.

[52] U.S. Cl. ............................ 428/410; 106/52; 65/30 R; 65/30 E; 428/218
[51] Int. Cl.$^2$ .................. B32B 17/00; C03C 21/00
[58] Field of Search ........... 428/410, 218; 65/30 R, 65/30 E; 161/166, 192; 106/52

[56] References Cited

UNITED STATES PATENTS

| | | | |
|---|---|---|---|
| 3,485,702 | 12/1969 | Mochel | 65/30 |
| 3,498,773 | 3/1970 | Grubb | 65/30 |
| 3,772,135 | 11/1973 | Hara | 428/410 |
| 3,778,335 | 12/1973 | Boyd | 65/30 E |
| 3,790,430 | 2/1974 | Mochel | 65/30 |

*Primary Examiner*—George F. Lesmes
*Assistant Examiner*—Ellis P. Robinson
*Attorney, Agent, or Firm*—Dennis G. Millman; William J. Uhl

[57] ABSTRACT

Disclosed are improved glass compositions of the $SiO_2$—$Na_2O$—$Al_2O_3$—$ZrO_2$ system for use in chemical strengthening. The improvement of the invention resides in proportioning the components so as to provide better melting glass compositions with lower liquidus temperatures and greater working ranges than normally associated with such systems. Such glasses are better suited for forming by the updraw or float methods.

2 Claims, 1 Drawing Figure

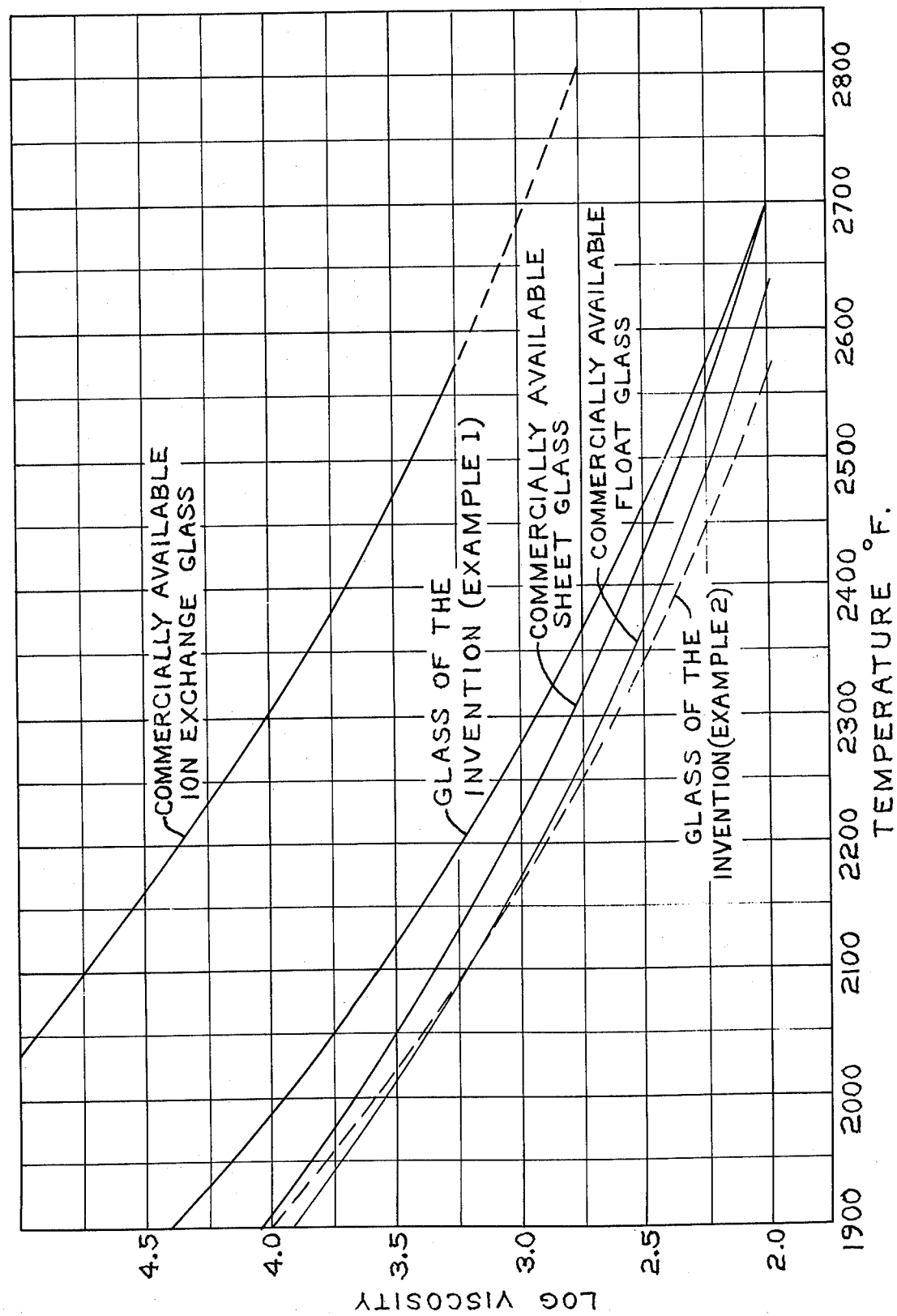

CHEMICAL STRENGTHENING OF GLASS

RELATED APPLICATION

This application is a continuation-in-part of application Serial No. 432,006, filed January 9, 1974, now abandoned.

BACKGROUND OF THE INVENTION

1. Field of the Invention

This invention relates to glass compositions suitable for strengthening by ion exchange and particularly relates to the strengthening of $SiO_2$—$Na_2O$—$Al_2O_3$—$ZrO_2$ glasses by potassium ion exchange.

2. Brief description of the Prior Art

U.S. Pat. Nos. 3,485,702 and 3,752,729, both to Mochel, deal with an improved glass composition of the $SiO_2$—$ZrO_2$—$Al_2O_3$—alkali metal oxide systems for chemical strengthening. These references disclose that the incorporation of 5 to 25 percent, preferably 10 to 25 percent by weight of $ZrO_2$ in the glass composition results in deep ion exchange penetrations with resultantly high compressive stresses in relatively short periods of time. Unfortunately, these high $ZrO_2$ containing glasses are not compatible with conventional float and updraw forming methods because of high melting and forming temperatures and unfavorable liquidus temperature-viscosity relationships. U.S. Pat. No. 3,772,135 to Hara et al. discloses glass compositions for chemical strengthening that represent some improvement in temperature-viscosity relationships, but still exhibit undesirably high melting temperatures, and disadvantageously limit the $ZrO_2$ content to low levels or eliminate it completely.

The liquidus is defined as the temperature at which devitrification or uncontrolled crystallization of the glass first appears as the temperature is lowered. At temperatures slightly below the liquidus, devitrification occurs, sometimes at a relatively rapid rate, and if uncontrolled could ruin the flat glass sheets, severely curtailing production yields. Somewhat related to liquidus and a problem of devitrificaton is the working range of the glass. The working range is defined for the purposes of this invention as the temperature interval between the glass-forming temperature which is usually taken as the glass temperature when the log of the viscosity of the glass is equal to 4 and the liquidus temperature. Melting and forming temperatures are defined for the purposes of this invention as the temperature at which the viscosity of the glass is equal to about 100 poises and 10,000 poises, respectively.

In flat glass manufacturing, it is desirable for a glass to have low melting and forming temperatures to enable easy working of the glass, to conserve fuel and to prevent excessive thermal deterioration of the glass melting and forming equipment. Further, in flat glass manufacturing, particularly by the float and the updraw process, it is desirable that the glass have a low liquidus temperature and a wide working range. A low liquidus temperature insures against devitrification in cold spots of the furnace and a wide working range insures against devitrification. In the glass forming area of the furnace. In the case of manufacturing glass by the updraw process such as the Pittsburgh Process by liquidus temperature of the glass is about 1840° F. and the working range of the glass is about 70° F. Commercial float glass has a liquidus temperature of about 1830° F. and a working range of about 45° F.

$ZrO_2$ has a pronounced effect on the liquidus temperature and the working range in the family of glasses disclosed in the above-mentioned Mochel patents. With $ZrO_2$ concentrations above about 5¼ percent, liquidus temperatures begin to increase quite rapidly with increasing $ZrO_2$. With $ZrO_2$ concentrations above 5½ percent by weight, a serious problem develops with respect to float or updraw forming. With these particular glasses, a narrow working range, and in many instances a negative working range, is established, that is, the liquidus temperature is higher than glass-forming temperature and devitrification occurs rather quickly. This could have disastrous effects if such glasses were formed on a commercial scale by the updraw or float methods. In addition, many of the glasses disclosed in the above-mentioned patents have high melting and forming temperatures making them undesirable for commercial flat glass manufacturing.

It is apparent from the above that it would be desirable to provide a family of glass compositions of the $SiO_2$—$Na_2O$—$AL_2O_3$—$ZrO_2$ system for use in chemical strengthening which would be more suitable for forming by the updraw and float processes than those $SiO_2$—$Na_2O$—$Al_2O_3$—$ZrO_2$ systems disclosed in the prior art. More particularly, it would be desirable to provide a family of glass compositions for ion exchange which have lower melting and forming temperatures and a wider working range than those glass compositions of the $SiO_2$—$Na_2O$—$Al_2O_3$—$ZrO_2$ systems disclosed in the prior art for ion exchange.

Besides the references mentioned above, other relevant prior art consists of U.S. Pat. Nos. 3,790,430 to Mochel; 3,498,773 to Grubb et al.; 3,524,737 to Doyle et al.; 3,433,611 to Saunders et al.; 3,416,936 to Sproul, Jr.; 2,252,466 to Hanlein; 3,499,776 to Baak et al.; 2,877,124 to Welsch; 2,978,341 to Bastian et al.; 3,357,876 to Rinehart and British Pat. No. 1,115,972.

SUMMARY OF THE INVENTION

In accordance with this invention, there is provided an improved method for strengthening an alkali metal oxide aluminosilicate glass article in which the alkali metal ions in the surface of the glass article are replaced by larger monovalent metal ions. The improved method is carried out by bringing the surface of the glass article into contact with the source of the larger monovalent metal ions by retaining the glass at an elevated temperature, usually around the glass strain point, to place a compression layer in a surface of the glass article. The improvement of the invention comprises forming the article to be strengthened from an alkali metal oxide-zirconia-aluminosilicate glass consisting essentially of by weight on the oxide basis of about:

| Component | Percent by Weight Broad Range | Preferred Range |
|---|---|---|
| $SiO_2$ | 50–58 | 52–57 |
| $Na_2O$ | 8–23 | 10–19 |
| $K_2O$ | 0–15 | 0–10 |
| $Na_2O + K_2O$ | 13–25 | 17–23 |
| $Al_2O_3$ | 7–17 | 9–13 |
| $ZrO_2$ | 1–4.5 | 2–4.5 |
| $Al_2O_3 + ZrO_2$ | 10–21 | 12–17 |
| CaO | 0–10 | 0 |
| MgO | 0–6.5 | 4–6 |
| CaO + MgO | 2.5–10 | 4–6 |
| $TiO_2$ | 0–7 | 1–6 |

-continued

| Component | Percent by Weight | |
|---|---|---|
| | Broad Range | Preferred Range |
| $TiO_2 + (MgO + CaO)$ | 4–14 | 5–12 |

When the glass components are maintained within the above prescribed ranges, the glasses have low melting and forming temperatures and have lower liquidus temperatures and greater working ranges than comparable glass compositions containing greater than 5 percent by weight $ZrO_2$. In fact, with many of the glass compositions of the present invention, devitrification generally occurs so slowly that it is difficult to detect any evidence of devitrification regardless of temperature. At the same time, the glass compositions of the present invention exhibit desirable ion exchange characteristics for purposes of chemical strengthening.

BRIEF DESCRIPTION OF THE DRAWING

The FIGURE is a graph of viscosity versus temperature plots for various glasses of the invention and glasses of the prior art.

DETAILED DESCRIPTION

EXAMPLES 1 - 2

The preferred embodiments of the invention employ glasses having the following calculated glass compositions which can be made by conventional melting and forming techniques.

| Component | Percent by Weight on the Oxide Basis | |
|---|---|---|
| | Example 1 | Example 2 |
| $SiO_2$ | 56.0 | 54.5 |
| $Na_2O$ | 18.0 | 18.0 |
| $Al_2O_3$ | 12.0 | 10.0 |
| $MgO$ | 4.5 | 5.0 |
| $K_2O$ | 3.0 | 3.0 |
| $ZrO_2$ | 4.5 | 4.5 |
| $TiO_2$ | 2.0 | 5.0 |

The glass of Example 2 is a better melting glass, i.e., melts at lower temperatures and has a lower viscosity versus temperature curve, than the glass of Example 1. However, the glass of Example 1 has better optical properties, i.e., is less colored and has slightly better radiant energy transmitting properties.

The glasses of the present invention such as set forth above in the preferred embodiments, have extremely good melting and forming properties, being more akin to commercial sheet and float glass than to an ion exchange glass. The FIGURE compares the viscosity-temperature relation of the above glasses with similar relations for commercial sheet glass sold under the trademark PENNVERNON (registered trademark of PPG Industries, Inc.), commercial float glass, for a commercially available ion exchange glass, and for glasses numbered 1, 2, 3 and 10 in Table I of U.S. Pat. 3,485,702, in the viscosity range of $10^{2.0}$ to $10^{5.0}$ poises. The calculated composition of PENNVERNON sheet glass is as follows: $SiO_2$, 73 percent; $Na_2O$, 13.3 percent; $CaO$, 8.2 percent; $MgO$, 3.7 percent; $Al_2O_3$, 1.2 percent; $Fe_2O_3$, 0.1 percent; $K_2O$, 0.2 percent; $SO_3$, 0.2 percent. The commercial float glass had the following actual composition: 73.06 percent $SiO_2$, 13.64 percent $Na_2O$, 0.03 percent $K_2O$, 8.86 percent $CaO$, 3.86 percent $MgO$, 0.12 percent $Al_2O_3$, 0.30 percent $SO_3$, and 0.13 percent $Fe_2O_3$. The actual composition of the commercially available ion exchange glass is as follows: 61.98 percent $SiO_2$, 13.08 percent $Na_2O$, 3.27 percent $K_2O$, 3.21 percent $MgO$, 17.56 percent $Al_2O_3$, 0.064 percent $Fe_2O_3$, 0.64 percent $TiO_2$, 0.04 percent $Cl^-$, 0.14 percent $CaO$, 0.07 percent $As_2O_5$, and 0.04 percent $SO_3$. The calculated compositions for the glasses numbered 1, 2, 3 and 10 in Table I of U.S. Pat. No. 3,485,702 are as follows:

| Component | Percent by Weight | | | |
|---|---|---|---|---|
| | 1 | 2 | 3 | 10 |
| $SiO_2$ | 66 | 60 | 59 | 52 |
| $Al_2O_3$ | 10 | 10 | 10 | 10 |
| $ZrO_2$ | 5 | 11 | 12 | 15 |
| $Na_2O$ | 16 | 16 | 16 | 16 |
| $K_2O$ | 3 | 3 | 3 | 7 |

U.S. Pat. No. 3,772,135 (Hara et al.) discloses only one specific example of a $ZrO_2$-containing glass (Example 5), which has the following composition by weight: 62% $SiO_2$, 10% $Al_2O_3$, 1% $ZrO_2$, 1% $TiO_2$, 9% $Na_2O$, 9% $K_2O$, 4% $MgO$, and 4% $ZnO$.

The tremendous melting advantage of the glasses of the present invention such as specified above in Examples 1 and 2 over the commercially available ion exchange glass and the ion exchange glass of the prior art is obvious. The melting temperatures or the temperatures corresponding to 100 poises ($log_{10}$ of the viscosity in poises is equal to 2.0) are as follows:

| Glass | Temperature at viscosity of 100 poises ° F. |
|---|---|
| Example 1 | 2700 |
| Example 2 | 2575 |
| Commercial Sheet Glass | 2705 |
| Commercial Float Glass | 2622 |
| Commercial Ion Exchange Glass | 3185 (estimated value) |
| U.S. Patent 3,485,702 (Mochel) | |
| Example 1 | 3022 |
| Example 2 | 2955 |
| Example 3 | 2953 |
| Example 10 | 2788 |
| U.S. Patent 3,772,135 (Hara et al) | |
| Example 5 | 2889 |

The glass-forming temperature is conventionally taken as the temperature at a viscosity level of about 10,000 poises ($log_{10}$ of the viscosity in poises is equal to 4.0). Thus, as indicated by the viscosity curves of FIG. 1, the forming temperature of the glass of Example 1 will be about 75° to 80° F. higher than the drawing temperature for commercial sheet glass and for commercial float glass. The glass of Example 2 had a forming temperature approximately equal to both commercial float and commercial sheet glass. The high temperature viscosity properties of the commercial sheet and float glass and the glasses of Examples 1 and 2 are presented in the table below. These high temperature viscosity properties, unless otherewise indicated, were measured according to the procedure described in "Measurements of Absolute Viscosity by the Use of Concentric Cylinder", H. R. Lillie, *J. Amer. Ceram, Soc.*, 12, No. 8, 505 (1929). See also U.S. Pat. No. 3,056,283 to Tiede.

Table I

| Log of the Viscosity in Poises | Commercial Sheet Glass | Commercial Float Glass | Glass of Ex. 1 | Glass of Ex. 2 | Commercial Ion Exchange Glass | U.S. Patent 3,485,702 | | | |
|---|---|---|---|---|---|---|---|---|---|
| | | | | | | 1 | 2 | 3 | 10 |
| 2 | 2705 | 2622 | 2700 | 2575 | 3185 | 3022 | 2955 | 2953 | 2788 |
| 3 | 2230 | 2169 | 2250 | 2175 | 2690 | 2503 | 2517 | 2522 | 2409 |
| 4 | 1920 | 1873 | 1980 | 1900 | 2305 | 2151 | 2223 | 2232 | 215 |
| Liquidus Temperature ° F. - procedure described in J. Soc. Glass Techn., 24, 101–108 (1940) by E. Preston | 1840 | 1830 | * | * | | | 1560** | 2025** | 2331** |
| Working Range ° F. | 30 | 43 | >125 | >125 | | | 663 | 207 | −174 |

*Attempts to determine the liquidus temperature and the working ranges of the glasses of Examples 1 and 2 were not successful. An alternate procedure, other than the one specified in the above table, was then used to determine the liquidus temperature and working range. Small platinum packets are filled with glass crushed in a hardened steel mortar and the packets positioned in sand along the temperature gradient of a gradient wound tube furnace. After a soak period of at least 66 hours, the packets are removed and quenched in water. The contents of each packet are then examined for the presence of crystals in the following manner. The fused glass is powdered in an agate mortar and a portion of the powder is placed on a microscope slide, along with a drop or two of oil with an index of refraction close to that of the glass. The submerged glass particles are then viewed with a microscope at 100X to 200X between crossed polarizers. In the absence of crystals the field remains dark. Birefringent crystals will rotate the plane of polarization of the light coming through the first polarizer and thus appear as bright areas in the dark field. In the glasses of Examples 1 and 2, no crystals were detected, thus indicating a working range of at least 125° F.
**Liquidus values reported in U.S. Patent 3,485,702.

The following series of tests give an indication of the chemical strengthening propensity of the glasses of Examples 1 and 2 in comparison to the commercially available ion exchange glass as described above.

TEST SPECIMENS

The test specimens used for evaluating strength are of two types: the first type of test specimen is a 2 inch by 2 inch by 0.100 inch ground and polished square. All plates are re-annealed. The second type of test specimen is a nominal 3 millimeter (mm) diameter rod approximately 2½ inches in length. Melts made in 4 inch diameter platinum crucibles provide glass for the test specimens. A melt consists of 750 grams of the oxide glass, homogenized during melting by about 4 hours of continuous stirring. Rods are drawn directly from the melt. The 2 inch square specimens are made from ¼ inch cast plates. It is the practice to re-anneal all plates and rods to remove thermal history frozen into the plates or rods when formed.

EXCHANGE TREATMENTS

All exchange treatments take place in molten $KNO_3$, the times and temperatures of the exchange depend upon the desired combination of compression layer thickness and strength.

SPECIMEN ABRASION

Following ion exchange and prior to testing, all strength samples are given 1 of 3 types of abrasion. The first type of abrasion is referred to as heavy abrasion. By this method of abrasion, a ¾ inch diameter circular area, centrally located on a 2 inch square specimen, is blasted with 2 cubic centimeters (cc) of 100 grit $Al_2O_3$ with an air pressure of 30 psi. This is the type of abrasion used in testing chemically strengthened glass for aircraft applications.

The second type of abrasion is referred to as light abrasion. In the practice of this invention, this type of abrasion is used with 2 inch square specimens for tests that apply to automotive and/or architectural applications. A ½ inch diameter circular area, centrally located on a specimen, is abraded with 10 cc of 25–30 grit silicon carbide that falls freely in a normal direction onto the area from a height of 12 inches.

The third type of abrasion is referred to as tumble abrasion. This type of abrasion is applicable to rods. A 16 ounce jar containing 10 rod specimens and 200 cc of 240 grit silicon carbide rotates about its main axis at a speed of about 167 rpm for 30 minutes.

TEST METHODS

Using a Rhiele testing machine, the 2 inch squares are evaluated for modulus of rupture by the method of concentrically loading, with the abraded surface placed in tension. The diameter of the load ring is ¾ inch. That of the support ring is 1½ inches. The modulus of rupture (MOR) corrected for both overhang and membrane effects is obtained as a computer solution of the following expression:

$$W = 2.160 \, \sigma \, h^2 + 2.325 \times 10^{-15} \, \sigma^3/h^2$$

where $W$ is the load at fracture, $\sigma$ is the modulus of rupture and h is the glass thickness. The test method for rods employs a 4 point loading configuration with a 1½ inch support span and a ¾ inch load span. The modulus of rupture for rods is given by the expression:

$$\sigma = 8WL/\pi a b^2$$

where $W$ is the load at fracture, $L$ is the distance between load and support points, $a$ is the large diameter of the rod, $b$ is the small diameter of the rod.

Table II presented immediately below shows the average modulus of rupture for the glass of Examples 1 and 2 given two different exchange treatments, both of which produce compression layers about 7 mils thick. A compression layer of this thickness is believed desirable for most use in aircraft applications. The results are also for samples given a heavy type of abrasion as described above.

Table II

| | Abraded MOR of Glasses of Examples 1 and 2 and Commercially Available Ion Exchange Glass | | |
|---|---|---|---|
| Glass | Exchange Conditions | Layer Depth | Abraded MOR |
| Example 1 | 24 hours - 950° F. - | 7 mils | 57,800 psi |

Table II-continued

Abraded MOR of Glasses of Examples 1 and 2 and Commercially Available Ion Exchange Glass

| Glass | Exchange Conditions | Layer Depth | Abraded MOR |
| --- | --- | --- | --- |
| Example 2 | KNO$_3$ " | " | 56,800 psi |
| Comm. Ion Exchange Glass | " | 8 mils | 57,700 psi |
| Example 2 | 48 hours - 900° F. - KNO$_3$ | 7 mils | 69,400 psi |
| Comm. Ion Exchange Glass | " | 8 mils | 59,200 psi |
| Example 1 | 96 hours - 850° F. - KNO$_3$ | 7 mils | 77,900 psi |
| Comm. Ion Exchange Glass | " | 8 mils | 66,200 psi |

With respect to potential aircraft use, it is clear that glasses of Examples 1 and 2 are as applicable as the commercially available ion exchange glass.

The suggested range of flexural strength for automotive windshield glass is 40,000 to 50,000 psi. Table III below shows the specific exchange conditions needed to provide the 2 inch square specimens of the glasses of Example 1 with nominal 2, 3 and 4 mil compression layers and an average strength falling within the suggested range. Tests were conducted with 2 inch by 2 inch by 0.100 inch ground and polished squares and light abrasion was used.

Table III

Exchange Conditions for 2, 3 and 4 mil Compression Layers On Glass of Example 1 With Modulus of Rupture in the 40,000-50,000 psi Range

| Exchange Temperature | Time | Layer Depth | MOR |
| --- | --- | --- | --- |
| 1050° F. | 0.5 hour | 2.0 mils | 45,200 psi |
| 1050° F. | 1.1 hours | 2.9 mils | 42,300 psi |
| 1025° F. | 3.0 hours | 4.0 mils | 46,500 psi |

The strength corresponding to a given compression layer thickness can be increased by carrying out the exchange at lower salt bath temperatures for longer times. Table IV below summarizes the results of modulus of rupture tests using tumble abraded rods of the glasses of Examples 1 and 2 exchanged at different temperatures for a period sufficient to produce 2 mil compression layers.

As has been mentioned, the glasses of the present invention are practically non-devitrifiable which makes them amenable to forming in sheet form by the updraw and float process. In sheet form, the glasses can be used to make chemically tempered glass patio and storm doors. Formerly, strengthened glass patio and storm doors have been thermally tempered.

However, there are a number of advantages associated with chemical tempering over thermal tempering. As the glass becomes thinner, it becomes increasingly more difficult to store sufficient internal energy by the thermal tempering method to produce small particles which are required by the safety codes for storm and patio doors, when fractures occur. On the other hand, with chemical tempering, it becomes easier to develop the necessary internal stress for small fracture particles when the glass becomes thinner, thus satisfying practically all of the safety codes. Also, with thermal tempering, there is a decided tendency for thin glass to distort when heated to temperatures required for thermal tempering. Distortion during chemical tempering is minimal, regardless of glass thickness. However, because of the slow rate of penetration of the strengthening ion and the low level of surface compressive stress produced, it is virtually impossible to generate sufficient internal stress in conventional soda-lime-silica glass by chemical means to satisfy the safety code for tempered storm and patio doors regarding particle size. However, glasses of the present invention can be sufficiently tempered by chemical means to satisfy the tempered glass safety code.

The following table shows the exchange times needed to produce center tension levels of 2100, 2500, 3000 and 4000 millimicrons (mu) per inch for the glass of Examples 1 to 2 of nominal 0.10 inch thickness. The center tension levels are expressed in terms of retardation measured by the graduated quartz wedge technique.

Table IV

Modulus of Rupture for Rods of Glasses of Examples 1 and 2 With 2 mil Compression Layer Produced at Different Temperatures

| Glass of Example 1 | | | Glass of Example 2 | | |
| --- | --- | --- | --- | --- | --- |
| Exchange Treatment | Layer Depth | MOR | Exchange Treatment | Layer Depth | MOR |
| 4 hours - 900° F. - KNO$_3$ | 2 mils | 88,700 psi | 4 hours - 900° F. - KNO$_3$ | 2 mils | 90,300 psi |
| 2 hours - 950° F. - KNO$_3$ | " | 77,200 psi | 2 hours - 950° F. - KNO$_3$ | " | 80,300 psi |
| 1 hour - 1000° F. - KNO$_3$ | " | 66,100 psi | 1 hour - 1000° F. - KNO$_3$ | " | 69,900 psi |
| ½ hour - 1050° F. - KNO$_3$ | " | 50,700 psi | ½ hour - 1050° F. - KNO$_3$ | " | 49,000 psi |

By way of comparison, the glass of Example 5 in U.S. Pat. No. 3,772,135 (Hara et al.), after being ion-exchanged in KNO$_3$ at 1000° F. for 1 hour, was found to have a compression layer depth of 1.8 to 1.9 mils but an abraded rod MOR of only 17,600 psi. When ion-exchanged for 4 hours in KNO$_3$ at 900° F., Hara's Example 5 glass exhibited an abraded rod MOR of 47,100 psi and a compression layer depth of 2.2 mils.

| Glass of Example 1 | | | Glass of Example 2 | | |
|---|---|---|---|---|---|
| Center Tension | Salt Temperature | Exchange Time | Center Tension | Salt Temperature | Exchange Time |
| 2100 mu/inch | 975° F. | 7.2 hours | 2100 mu/inch | 975° F. | 9.0 hours |
| 2500 mu/inch | 975° F. | 11.5 hours | 2500 mu/inch | 975° F. | 15.4 hours |
| 3000 mu/inch | 975° F. | 19.6 hours | 3000 mu/inch | 975° F. | 27.2 hours |
| 4000 mu/inch | 975° F. | 48.3 hours | 4000 mu/inch | 975° F. | 65.6 hours |

It will require shorter exchange times to produce the same stress levels in thinner glass. For example, to produce center tension levels of 2100 to 4000 mu/inch in the above glass of 0.0750 inch thickness will require the following exchange times.

| Glass of Example 1 | | | Glass of Example 2 | | |
|---|---|---|---|---|---|
| Center Tension | Salt Temperature | Exchange Time | Center Tension | Salt Temperature | Exchange Time |
| 2100 mu/inch | 975° F. | 2.3 hours | 2100 mu/inch | 975° F. | 3.3 hours |
| 2500 mu/inch | 975° F. | 3.6 hours | 2500 mu/inch | 975° F. | 5.0 hours |
| 3000 mu/inch | 975° F. | 5.9 hours | 3000 mu/inch | 975° F. | 8.0 hours |
| 4000 mu/inch | 975° F. | 13.1 hours | 4000 mu/inch | 975° F. | 20.2 hours |

The ion strengthened special glasses such as described above are stronger than fully heat tempered soda-lime-silica glass. The modulus of rupture of the above chemically tempered glass is at least two times that of fully heat treated soda-lime-silica glass. On this basis, tempered glass such as described above of 0.090 inch thickness will have the same load bearing strength as 0.125 inch fully heat tempered soda-lime-silica glass. Full temper by thermal quench is presently limited to glasses of 0.125 inch and above for soda-lime-silica glass. Thus, with the special glasses of the present invention and chemical tempering, it is possible to reduce the lower thickness limit for fully tempered glass by 29 percent or more without jeopardizing safety or load bearing strength.

The glass compositions referred to above can be produced from conventional glass-making materials properly compounded and thoroughly mixed so as to yield, when reacted, glasses of the desired composition. Suitable batch materials include glass sand, soda ash (sodium carbonate), caustic soda (sodium hydroxide), magnesite, dolomite, talc, aluminum hydrate, feldspar, aplite, nepheline syenite, zircon sand, carbon and cullet.

Besides the above-mentioned batch, melting and refining agents, such as $Sb_2O_5$, $As_2O_5$, $Na_2SO_4$ and NaCl could also be incorporated in the glass batch. Various glass coloring agents such as compounds containing iron, cobalt, nickel, coal, silver, chromium, copper and selenium may also be added in small concentrations to the glass batch to color the final glass without impairing its desirable ion exchange properties.

For the production of glass by the updraw or float process, the well-mixed batch ingredients are fed on a continuous basis to a tank furnace to be melted and refined. The batch ingredients can be fed to the furnace as loose batch or alternately, they can be first pelletized on an inclined, rotating disc pelletizer or the like using caustic soda as a binding agent and as a total or partial replacement for soda ash. The tank furnaces for the updraw and float process are similar to most glass-making furnaces in that they are usually gas-fired and of the regenerative type well known in the art. In the updraw process, such as the Pittsburgh Process, the glass is drawn vertically upwards between rollers from the surface of a bay or drawing kiln which is located at the working end of the tank. A detailed description of the updraw process, more particularly the Pittsburgh Process may be found in *Glass Manual*, Pittsburgh Plate Glass Company, published in 1946. The float process for the forming of flat glass consists of floating glass sheet upon the surface of a bath of molten metal, usually tin. The float process is well known in the art and is fully described in U.S. Pat. No. 3,083,551.

After the glass has been properly melted, refined and formed as generally described above, it should have the following composition as determined by a standard wet chemical and spectrophotometric analysis:

| Component | Percent by Weight on the Oxide Basis | |
|---|---|---|
| | Broad Range | Preferred Range |
| $SiO_2$ | 50–58 | 52–57 |
| $Na_2O$ | 8–23 | 10–19 |
| $K_2O$ | 0–15 | 0–10 |
| $Na_2O + K_2O$ | 13–25 | 17–23 |
| $Al_2O_3$ | 7–17 | 9–13 |
| $ZrO_2$ | 1–4.5 | 2–4.5 |
| $Al_2O_3 + ZrO_2$ | 10–21 | 12–17 |
| CaO | 0–10 | 0 |
| MgO | 0–6.5 | 4–6 |
| CaO + MgO | 2.5–10 | 4–6 |
| $TiO_2$ | 0–7 | 1–6 |
| $TiO_2 + (MgO + CaO)$ | 4–14 | 5–12 |

With regards to the individual components, $SiO_2$ is the glass former and is needed to produce high temperature stability and chemical durability in the glass. Concentrations lower than the recommended amount, that is, lower than 50 percent, decrease the durability, whereas higher concentrations, that is, higher than 58 percent, require higher melting temperatures and decrease the melting rates. Sodium oxide is present as a flux to reduce the melting temperature of the glass. Also, is is present to provide the sites necessary for subsequent ion exchange. $K_2O$ is an optional ingredient which provides fluxing activity to the glass melt. Its presence is due usually to the use of nepheline syenite in the batch material which is a particularly desirable batch ingredient because of its cheapness and plentiful supply. Also, $K_2O$ is believed to increase ion exchange rates. When the $K_2O$ content is reduced, the reduction should be compensated for by an increase in the $Na_2O$ content to maintain the viscosity level. When the $Na_2O$ concentration is greater than the broad range specified above, that is, greater than 23 percent, the chemical durability of the glass, as measured by exposure to sulfuric acid, sodium hydroxide and water, will suffer. On the other hand, when the percentage by weight of $Na_2O$ or $Na_2O$ plus $K_2O$ is below the range specified, that is, below 13 percent by weight, the melting temperature of the glass will be exceedingly high. The effect of varying the $K_2O$ and $Na_2O$ contents may be seen in Table XII. With regards to the alkali metal oxides, $Li_2O$ has been found to decrease the rate of ion exchange and to impair the strength of the resultant chemically tempered glass article of the above compositional family, and, therefore, the glasses of the present invention should be substantially free of $Li_2O$. By the expression substantially free of $Li_2O$ is meant that there is no purposeful addition of a lithium compound to the glass batch. Any $LiO_2$ which is analytically determined in the final glass is present in the impurity quantities, that is, less than 0.1 percent by weight.

With high $Al_2O_3$ plus $ZrO_2$ contents, the batch is not as soluble in the melt as it is with lower concentrations. Also, the $Al_2O_3$ plus $ZrO_2$ concentration should not be below 10 percent by weight because the degree of potential strengthening in the glass will diminish to an undesirably low level.

EXAMPLES 3-9

The $ZrO_2$ content is essential in obtaining low temperature melting properties while maintaining credible strength and good chemical durability. To demonstrate the role of $ZrO_2$ in glass, this oxide was completely replaced by an equivalent amount of $SiO_2$ and with $Al_2O_3$. The replacement with $Al_2O_3$ will most nearly preserve strength, insomuch as strength was found to be dependent on the total $Al_2O_3$ plus $ZrO_2$ content.

Tables V and VI show the effects of these replacements on strength and other various properties.

Table V

| Component | $SiO_2$ for $ZrO_2$ Substitution to Reduce Strength | | | | |
|---|---|---|---|---|---|
| | Example 2 | Example 3 | Example 4 | Example 5 | Example 6 |
| $SiO_2$ | 54.5 | 55.5 | 56.5 | 57.5 | 59 |
| $Na_2O$ | 18.0 | 18.0 | 18.0 | 18.0 | 18.0 |
| $Al_2O_3$ | 10.0 | 10.0 | 10.0 | 10.0 | 10.0 |
| MgO | 5.0 | 5.0 | 5.0 | 5.0 | 5.0 |
| $K_2O$ | 3.0 | 3.0 | 3.0 | 3.0 | 3.0 |
| $ZrO_2$ | 4.5 | 3.5 | 2.5 | 1.5 | 0 |
| $TiO_2$ | 5.0 | 5.0 | 5.0 | 5.0 | 5.0 |
| Abraded Rod MOR in psi[1] | 65,900 | 52,100 | 49,100 | 41,100 | 36,370 |
| Temperature at $10^{2.0}$ poises °F. | 2575 | 2590 | — | 2624 | 2638 |

1 - Ion exchange conditions - 1 hour at 1000° F. in molten $KNO_3$; MOR's 4-point loading, nominal 2 mils compressed layer.

Table VI

| | Effect of $ZrO_2$ on Strength, Melting Properties and Acid Durability | | | | |
|---|---|---|---|---|---|
| | Percent by Weight on the Oxide Basis | | | | |
| Component | Example 1 | Example 2 | Example 7 | Example 8 | Example 9 |
| $SiO_2$ | 56.0 | 54.5 | 56.0 | 58.0 | 53.5 |
| $Na_2O$ | 18.0 | 18.0 | 18.0 | 16.0 | 17.0 |
| $Al_2O_3$ | 12.0 | 10.0 | 16.5 | 16.5 | 11.0 |
| MgO | 4.5 | 5.0 | 4.5 | 4.5 | 5.0 |
| $K_2O$ | 3.0 | 3.0 | 3.0 | 3.0 | 3.0 |
| $ZrO_2$ | 4.5 | 4.5 | — | — | 4.5 |
| $TiO_2$ | 2.0 | 5.0 | 2.0 | 2.0 | 6.0 |
| Physical Properties | | | | | |
| Temperature at $10^{2.0}$ poises | 2696° F. | 2575° F. | 2807° F. | 2924° F. | 2602° F. |
| Annealing Point | 1070° F. | 1070° F. | 1067° F. | 1105° F. | 1094° F. |
| Abraded MOR (Rods)[1] | 66,100 psi | 69,900 psi | 55,900 psi | — | 78,300 psi |
| Weight Loss in Acid[2] | 0.01 mg/cm² | 0.01 mg/cm² | 1.21 mg/cm² | 0.02 mg/cm² | 0.01 mg/cm² |

[1] - 1 hour - 1000° F. - $KNO_3$ - Tumble abrasion; 4-point loading, nominal 2 mils compression layer.
[2] - Unexchanged 2 inch square boiled 30 minutes in 0.5 weight percent $H_2SO_4$.

$Al_2O_3$ is present in the glass to promote the ion-exchange properties of the glass, such as increasing the rates of ion exchange. Also, higher $Al_2O_3$ concentrations increase the strain point which results in the possibility of higher ion exchange temperatures and faster and deeper ion exchanges and penetrations. Concentrations of alumina lower than the recommended amount, that is, less than 7 percent by weight, decrease the ultimate strength obtainable in the glass, whereas higher concentrations than recommended, that is, higher than 17 percent, decrease the melting rate and result in poor acid durability. The strength of the resultant chemically tempered glass articles are dependent upon the combined total of $ZrO_2$ plus $Al_2O_3$. However, the $Al_2O_3$ plus $ZrO_2$ concentration should not be greater than 21 percent because of difficulty in melting.

From the above Tables V and VI, it is clear that the elimination of $ZrO_2$ is damaging in three respects: it directly raises the melting temperature, strength is decreased, and it caused a serious breakdown in resistance to attack in an acid environment. To restore acid resistance will require a substantial reduction of $Na_2O$. This increases viscosity even more and leads to a viscous glass. For example, glass 8 in the above table contains 2 percent less $Na_2O$ than glass 7. This change caused the temperature corresponding to the viscosity at 100 poises to increase another 117° F. for a total increase of 228° F. over the corresponding temperature for glass 1. But the data presented in the above table shows that even with this increase in viscosity, the restoration of acid durability is still not complete.

Therefore, from the data in Tables V and VI it is shown that $ZrO_2$ plus $Al_2O_3$ should not be diminished if strength is to be preserved. They also show that there must be a combination of $ZrO_2$ and $Al_2O_3$ present to maintain high strength and good chemical durability in a low temperature melting glass. It is concluded that the $ZrO_2$ content should be at least 1.0, and preferably 2 to 4.5 percent by weight and $ZrO_2$ plus $Al_2O_3$ content of 10–21, and preferably 12–17 percent by weight. The $ZrO_2$ component of glasses is directly responsible for lowering the melting requirements of the soda-zirconia-aluminosilicate ion exchange glasses of the present invention. The partial substitution of the $ZrO_2$ for $Al_2O_3$ (without reducing strength) is indirectly responsible for reducing the melting requirement much more. It does this by permitting a substantial increase in the use of $Na_2O$ without seriously degrading acid durability. $ZrO_2$ is therefore important principal ingredient for a strong glass that will melt at low temperatures and will offer good resistance to attack in acid, neutral and alkaline environments.

EXAMPLES 10 – 13

Titania ($TiO_2$) also has a pronounced effect on melting temperature and an apparent effect on the development of strength in the chemically strengthened glasses of the invention. The following examples are presented to show the effects of $TiO_2$ on strength and melting properties.

Table VII

Effect of $TiO_2$ on Strength and Melting

| Component | Example 2 | Example 10 | Example 11 | Example 12 | Example 13 |
|---|---|---|---|---|---|
| $SiO_2$ | 54.5 | 55.5 | 56.5 | 57.5 | 53.5 |
| $Na_2O$ | 18.0 | 18.0 | 18.0 | 18.0 | 18.0 |
| $Al_2O_3$ | 10.0 | 10.0 | 10.0 | 10.0 | 10.0 |
| MgO | 5.0 | 5.0 | 5.0 | 5.0 | 5.0 |
| $K_2O$ | 3.0 | 3.0 | 3.0 | 3.0 | 3.0 |
| $ZrO_2$ | 4.5 | 4.5 | 4.5 | 4.5 | 4.5 |
| $TiO_2$ | 5.0 | 4.0 | 3.0 | 2.0 | 6.0 |
| Temperature at $10^{2.0}$ poises ° F. | 2579 | 2612 | 2633 | 2667 | 2557 |
| Annealing Point° F. | 1059 | 1063 | 1054 | 1054 | 1067 |
| Abraded Rod MOR in psi[1] | 60,095 | 48,075 | 56,640 | 44,314 | 66,684 |

[1]Ion exchange conditions - 1 hour at 1000° F. in molten $KNO_3$; MOR's 4-point loading, nominal 2 mils compression layer.

The reduction of $TiO_2$ from a high of 6.0 percent in Example 13 to 2 percent in Example 12 caused the melting temperature to increase about 110° F. Further, $TiO_2$ appears to have an effect on strength developed in chemically tempered glass. With the exception of Example 10, there is a steady increase in strength as the $TiO_2$ content is increased from 2 to 6 percent.

EXAMPLES 14–26

To show the effect that $ZrO_2$ concentrations have on the liquidus temperature and working range of ion exchange glasses, glasses having the following calculated glass compositions were made by conventional melting and forming techniques.

Table VIII

Role of $ZrO_2$ on Working Range and Liquidus

| Component | Example 14 | Example 15 | Example 16 | Example 17 | Example 18 | Example 19 | Example 20 |
|---|---|---|---|---|---|---|---|
| $SiO_2$ | 56.75 | 57.0 | 57.25 | 57.5 | 58.0 | 59.0 | 60.0 |
| $Na_2O$ | 16.0 | 16.0 | 16.0 | 16.0 | 16.0 | 16.0 | 16.0 |
| $Al_2O_3$ | 13.5 | 13.5 | 13.5 | 13.5 | 13.5 | 13.5 | 13.5 |
| MgO | 4.5 | 4.5 | 4.5 | 4.5 | 4.5 | 4.5 | 4.5 |
| $K_2O$ | 3.0 | 3.0 | 3.0 | 3.0 | 3.0 | 3.0 | 3.0 |
| $ZrO_2$ | 6.25 | 6.0 | 5.75 | 5.5 | 5.0 | 4.0 | 3.0 |
| Temperature at $10^{2.0}$ poises, ° F. | — | 2848 | — | — | 2875 | 2896 | 2911 |
| Temperature at $10^{4.0}$ poises, ° F. | ≈2134 | 2134 | ≈2134 | ≈2134 | 2138 | 2139 | 2139 |
| Liquidus Temperature, ° F. | 2336 | 2240 | 2240 | 2146 | NCD* | NCD* | NCD* |
| Working Range, ° F. | −202 | −106 | −106 | −12 | >125 | >125 | >125 |

| Component | Example 21 | Example 22 | Example 23 | Example 24 | Example 25 | Example 1 | Example 26 |
|---|---|---|---|---|---|---|---|
| $SiO_2$ | 61.0 | 54.5 | 54.5 | 55.0 | 55.5 | 56.0 | 56.5 |
| $Na_2O$ | 16.0 | 18.0 | 18.0 | 18.0 | 18.0 | 18.0 | 18.0 |
| $Al_2O_3$ | 13.5 | 12.0 | 12.0 | 12.0 | 12.0 | 12.0 | 12.0 |
| MgO | 4.5 | 3.5 | 4.5 | 4.5 | 4.5 | 4.5 | 4.5 |
| $K_2O$ | 3.0 | 3.0 | 3.0 | 3.0 | 3.0 | 3.0 | 3.0 |
| $ZrO_2$ | 2.0 | 7.0 | 6.0 | 5.5 | 5.0 | 4.5 | 4.0 |
| $TiO_2$ | — | 2.0 | 2.0 | 2.0 | 2.0 | 2.0 | 2.0 |
| Temperature at $10^{2.0}$ poises, ° F. | 2934 | 2697 | 2687 | 2677 | 2697 | 2696 | 2722 |
| Temperature at $10^{4.0}$ poises, ° F. | 2136 | 2015 | 1998 | 1984 | 1990 | 1981 | 2002 |
| Liquidus Temperature, ° F. | NCD* | 2050 | 1996 | 1944 | 1926 | NCD* | NCD* |
| Working Range, ° F. | >125 | −35 | 2 | 40 | 64 | >125 | >125 |

*No crystals determined.

The above experiments show that when $ZrO_2$ is maintained below 5 percent by weight, within the range of 2 to 4.5 percent by weight, devitrification generally occurs so slowly that it is difficult to detect any evidence of devitrification under the conditions given. On the other hand, glass compositions containing greater than 5 percent by weight $ZrO_2$ have narrow working ranges and may even have liquidus temperatures above the forming temperatures, resulting in a negative working range and could pose a serious problem with respect to float or updraw forming.

It should be mentioned at this point where it is stated in the specification and claims that the glass compositions of the present invention have working ranges greater than 125° F. what is meant is that no detectable crystals developed when the glass was heated for at least 66 hours at a temperature range extending from above the temperature corresponding to $10^{4.0}$ poises to at least 125° F. below such temperature. The method for determining liquidus temperatures and for detecting crystals is as described above. That is, small platinum packets are filled with glass crushed in a hardened steel mortar and the packets positioned in sand along the temperature gradient of a gradient wound tube furnace. After a soak period of at least 66 hours, the packets are removed and quenched in water. The contents of each packet are then examined for the presence of crystals in the following manner. The fused glass is powdered in an agate mortar and a portion of the powder is placed on a microscope slide, along with a drop or two of oil with an index of refraction close to that of the glass. The submerged glass particles are then viewed with a microscope at 100X to 200X between crossed polarizers. In the absence of crystals, the field remains dark. Birefringent crystals will rotate the plane of polarization of the light coming through the first polarizer and thus appear as bright areas in the dark field.

EXAMPLES 27–29

MgO and CaO are employed as fluxes to decrease the melting temperature. Preferably, MgO is the total source of alkaline earth metal oxide in the glass batch. MgO provides for enhanced strength in the resultant chemically strengthened article. Strength is decreased somewhat if CaO is substituted for MgO as Table IX below shows.

plete. Even in this instance, however, strength would appear to remain adequate for most potential uses. CaO is shown to be a somewhat better flux than MgO, insomuch as high temperature viscosity decreases with its substitution for MgO, and acid durability remains unchanged. The working range in most instances will be adequate for updraw as well as for float forming. In addition, the simple substitution of CaO for MgO on a partial or total basis offers a means of controlling the strength of the glass in the manufacturing stage. With regards to the total MgO plus CaO content, higher than recommended contents, that is, higher than 10 percent by weight, result in slow penetration of the strengthening ions, and contents lower than 2.5 percent by weight result in viscous high melting glasses.

As has been mentioned above, $TiO_2$ is a preferred component because it assists in obtaining low temperature melting properties while maintaining credible strength and good chemical durability. However, in certain applications, it might be desirable to reduce or eliminate $TiO_2$ in order to reduce batch costs or when introducing iron into the glass to make and infrared radiation absorbing glass for ion exchange purposes. To compensate for the viscosity increases that accompany the reduction or elimination of $TiO_2$, one or more of the fluxing components of the glass should be increased.

Besides the above-mentioned components, the final glass composition can also contain minor amounts, that is, less than 1 percent by weight of various oxides and anions such as $As_2O_5$, $Sb_2O_5$, $SO_4^{-2}$ and $Cl^-$ which result from the incorporation of melting and fining agents in the glass batch materials. Coloring agents in the form of transition metal oxides, such as iron, nickel and cobalt oxides in concentrations on the order of 5 percent or less can also be present in the final glass composition. Higher concentrations, that is, on the order of 5 percent, are used when a densely colored glass is desired. Lower concentrations, i.e., on the order of 1 percent or less, are used for higher visible light transmittance glasses. Table X below lists various glass compositions which contain coloring metal oxides and which are suitable for tinted spectacle lenses and architectural applications.

Table IX

| Component | Example 2 | Example 27 | Example 28 | Example 29 |
|---|---|---|---|---|
| $SiO_2$ | 54.5 | 54.5 | 54.5 | 54.5 |
| $Na_2O$ | 18.0 | 18.0 | 18.0 | 18.0 |
| $Al_2O_3$ | 10.0 | 10.0 | 10.0 | 10.0 |
| MgO | 5.0 | 3.5 | 2.0 | 0 |
| $K_2O$ | 3.0 | 3.0 | 3.0 | 3.0 |
| $ZrO_2$ | 4.5 | 4.5 | 4.5 | 4.5 |
| $TiO_2$ | 5.0 | 5.0 | 5.0 | 5.0 |
| CaO | 0 | 1.5 | 3.0 | 5 |
| CaO / (CaO + MgO) | 0 | 0.3 | 0.6 | 1.0 |
| Abraded Rod MOR[1] (psi) | 65,200 | 61,400 | 48,200 | 45,100 |

[1] All rods exchanged for 1 hour in $KNO_3$ at 1000° F. test; 4-point loading.

From the above table, it can be seen that the glasses representing substitutions for MgO all contain 5 percent alkaline earth metal oxide (MgO plus CaO). It is evident from the data in the above table that as CaO replaces MgO, there is a decrease in strength. The decrease is a maximum when the replacement is com- Table X

| Component | Example 30 | Example 31 | Example 32 |
|---|---|---|---|
| $SiO_2$ | 54.5 | 53.6 | 49.5 |
| $Na_2O$ | 18.0 | 18.0 | 18.0 |
| $Al_2O_3$ | 10.0 | 10.0 | 10.0 |
| MgO | 5.0 | 5.0 | 5.0 |
| $K_2O$ | 3.0 | 3.0 | 3.0 |
| $ZrO_2$ | 4.5 | 4.5 | 4.5 |
| $TiO_2$ | 5.0 | 5.0 | 5.0 |
| CoO | 0.011 | 0.011 | — |

Table X-continued

| Component | Example 30 | Example 31 | Example 32 |
|---|---|---|---|
| NiO | 0.063 | 0.063 | — |
| $Fe_2O_3$ | — | 0.8 | 5.0 |
| Shade | neutral | olive green | rose smoke |
| % Luminous Transmittance | | | |
| (Illuminant C) | | | |
| 0.079 inch | 58.2 percent | 49.8 percent | 14.3 percent |
| 0.250 inch | 21.8 percent | 13.5 percent | — |

The chemical strengthening treatment presently used for imparting the necessary impact resistance to conventional crown spectacle lenses (e.g., a glass having the following analyzed composition: $SiO_2$, 67.42 percent; $Al_2O_3$, 1.98 percent; $Na_2O$, 8.45 percent; $K_2O$, 8.80 percent; CaO, 9.09 percent; ZnO, 2.90 percent; $TiO_2$, 0.34 percent; $Sb_2O_5$, 1.02 percent) consists of a 16-hour soak in $KNO_3$ at 470° C. (878° F.). This treatment produces a compression layer on the surface of this glass that is about 2 mils thick. A compression layer of the same thickness, but with a considerably higher stress level, can be produced in the above three types of glasses (Examples 30–32) in only one hour or less.

Besides the reduced strengthening time and higher surface stress values, the above glasses offer other advantages over many conventional crown spectacle glass compositions in that the above glasses are essentially non-devitrifiable. These latter characteristics make the glass particularly compatible and especially suitable for conventional melting and pressing operations or for any method of producing ophthalmic glass blanks or glass sheets. The following tabulation compares some of the properties of the above three glass compositions to the corresponding properties of a conventional ophthalmic crown glass such as the one mentioned above.

Table XI

| | Conventional Ophthalmic Crown Glass | Glasses of Example 30* |
|---|---|---|
| Temperature at $10^{2.0}$ poises | 2667° F. | 2583° F. |
| Temperature at $10^{4.0}$ poises | 1888° F. | 1899° F. |
| Annealing Point | 1026° F. | 1068° F. |
| $KNO_3$ Exchange Bath Temperature | 900° F. | 1000° F. |
| Exchange Time for 2 mil compression layer | 16 hours | 1 hour |
| Average abraded modulus of rupture (Rods) (Tumble abrasion) | 35,800 psi | 67,800 psi |

*Properties for Glasses 31 and 32 would be comparable.

The tinted glass compositions of the present invention are not restricted to exchange treatment time and temperatures as cited above. Alternate exchange treatments that will produce a nominal 2 mil compression layer on these glasses are shown in the following tabulation, together with the average tumble abraded modulus of rupture (MOR) values for rods of glass.

| | Glass of Example 31* | |
|---|---|---|
| $KNO_3$ Temperature | Exchange Time | Average Abraded MOR** |
| 1050° F. | ½ hour | 49,000 psi |
| 1000° F. | 1 hour | 64,800 psi |
| 950° F. | 2 hours | 76,200 psi |
| 900° F. | 4 hours | 87,800 psi |

*Comparable results obtainable with Glasses 30 and 32.
**Tumble abrasion

Other optional ingredients such as ZnO, SrO, PbO, $P_2O_5$ and BaO can be present in the final glass composition in concentrations of up to 2 percent by weight. The total amount of optional ingredients, that is, the total amount of melting and fining agents, transition metal oxides and other optional ingredients such as those mentioned immediately above, in total, should constitute no more than 5 percent by weight of the final glass composition.

Examples 33 through 43 set forth in Table XII illustrate additional ion exchange glass compositions falling within the scope of the present invention, and show the effect of varying the total $Na_2O + K_2O$ content and the $Na_2O$ to $K_2O$ ratio of the glass.

The alkali metal exchange strengthening treatments contemplated by the present invention are achieved by contacting the surface of the base glass with an alkali metal salt having an atomic diameter larger than sodium at an elevated temperature and for a period of time long enough to obtain a substantial exchange for the larger atomic diameter alkali metal for sodium and other exchangeable alkali or other metals in the base glass having atomic diameters smaller than the alkali metal employed for strengthening.

The alkali metal strengthening treatment is usually conducted at temperatures around the strain point of the base glass, that is, with glass of the invention, about 925°–1050° F. for a sufficient period of time to replace to a marked extent the sodium and other available smaller atomic diameter metal or metals by the larger atomic diameter alkali metal or metals of the treating salt. When highest ultimate strengths are desired, the treatment temperature is usually below the strain point, i.e., 25° to 150° F. below the strain point. Where lower strengths are adequate and speed of operation is important, the treatment may be conducted at temperatures slightly above the strain point of the glass, that is, about 25° to 100° F. above the strain point, if the treatment is conducted quickly so as not to relax excessively the compressive stresses induced in the surface of the glass by the ion exchange.

TABLE XII

| Component | Example 33 | Example 34 | Example 35 | Example 36 | Example 37 | Example 38 | Example 39 |
|---|---|---|---|---|---|---|---|
| $SiO_2$ | 57.5 | 54.5 | 54.5 | 54.5 | 54.5 | 50.5 | 50.5 |
| $Na_2O$ | 18.0 | 21.0 | 15.0 | 12.0 | 9.0 | 23.0 | 20.0 |
| $K_2O$ | — | — | 6.0 | 9.0 | 12.0 | — | 3.0 |
| $Al_2O_3$ | 10.0 | 10.0 | 12.0 | 12.0 | 10.0 | 12.0 | 12.0 |
| $ZrO_2$ | 4.5 | 4.5 | 4.5 | 4.5 | 4.5 | 4.5 | 4.5 |

TABLE XII-continued

| | | | | | | | |
|---|---|---|---|---|---|---|---|
| MgO | 5.0 | 5.0 | 5.0 | 5.0 | 5.0 | 5.0 | 5.0 |
| TiO$_2$ | 5.0 | 5.0 | 5.0 | 5.0 | 5.0 | 5.0 | 5.0 |
| Annealing Point ° F. | 1109 | 1067 | 1075 | 1082 | 1112 | 1054 | 1049 |
| Temp. at 100 poises, ° F. | 2674 | 2534 | 2647 | 2718 | 2789 | 2471 | 2576 |
| Temp. at 10,000 poises, ° F. | 1966 | 1867 | 1947 | 2002 | 2066 | 1832 | 1859 |
| Compression layer depth, mils* | 1.4 | 2.0 | 2.2 | 2.6 | 2.8 | 2.3 | 2.6 |
| Compression layer depth, mils** | 1.4 | 1.9 | 2.5 | 3.1 | 3.3 | 2.3 | 2.5 |
| Abraded rod MOR, psi* | 59,400 | 35,900 | 56,100 | 61,900 | 51,300 | 26,500 | 47,100 |
| Abraded rod MOR, psi** | 70,200 | 69,000 | 77,800 | 66,700 | 56,200 | 66,000 | 75,800 |

| Component | Example 40 | Example 41 | Example 42 | Example 43 |
|---|---|---|---|---|
| SiO$_2$ | 50.5 | 50.5 | 50.5 | 50.5 |
| Na$_2$O | 16.0 | 13.0 | 10.0 | 18.0 |
| K$_2$O | 7.0 | 10.0 | 13.0 | 7.0 |
| Al$_2$O$_3$ | 10.0 | 10.0 | 10.0 | 12.0 |
| ZrO$_2$ | 4.5 | 4.5 | 4.5 | 4.5 |
| MgO | 5.0 | 5.0 | 5.0 | 5.0 |
| TiO$_2$ | 5.0 | 5.0 | 5.0 | 5.0 |
| Annealing Point ° F. | 1060 | 1076 | 1101 | 1011 |
| Temp. at 100 poises, ° F. | 2589 | 2651 | 2724 | 2488 |
| Temp. at 10,000 poises, ° F. | 1912 | 1966 | 2032 | 1830 |
| Compression layer depth, mils* | 2.7 | 3.1 | 3.4 | 3.2 |
| Compression layer depth, mils** | 2.7 | 3.3 | 3.7 | 3.4 |
| Abraded rod MOR, psi* | 55,500 | 58,900 | 53,000 | 24,800 |
| Abraded rod MOR, psi** | 77,400 | 77,900 | 56,100 | 63,400 |

*Ion exchanged 1 hr. at 1000° F. in molten KNO$_3$
**Ion exchanged 4 hrs. at 900° F. in molten KNO$_3$ The length of the treatment period depends upon several factors including, among others, the specific composition of the base glass, the relative rate of exchange of a given larger atomic diameter alkali metal, and the specific treatment temperature. The temperature period can range from short contact periods of about several minutes up to a period of 100 hours. However, for treatment temperatures in excess of about 850° F. and ranging from about 900° F. to 1025° F., contact periods of about 10 minutes to 50 hours are usually sufficient depending on the thickness of the compression layer desired. In fact, when higher treatment temperatures are used, that is, 1050° to 1100° F., the base glass compositions can be provided with greatly enhanced surface compressive stresses and load strengths by treatment times ranging from 8 minutes to 2 hours depending on the thickness of the compression layer desired. Longer periods of contact are not objectionable to obtain a given set of objectives so long as the surface compressive strength and the load strength induced by the alkali metal strengthening treatment is substantially retained over the entire treatment period at the treatment temperatures employed.

The results of the larger atomic diameter alkali metal strengthening treatment is to deplete the sodium content on the surface and thereby generate a surface which is in compression for a specified depth of penetration and is rich in the larger atomic diameter alkali metal, for example, potassium, cesium and rubidium, of the alkali metal treating salt employed for strengthening. When potassium is employed as the larger atomic diameter alkali metal, the penetration of potassium into the surface of the treated glass usually takes place to a depth of about 25 to 250 microns, although other depths are obtainable by varying the ion exchange process parameters, as is known in the art.

The potassium metal salt causes the imposition of enhanced surface compressive stress to a greater depth than obtainable when using cesium or rubidium salts. Also, as between potassium, cesium and rubidium, potassium strengthening salts are more readily available and hence less expensive.

The alkali metal salt strengthening treatment is conducted conveniently by immersing the base glass into a molten bath of the larger atomic diameter alkali metal strengthening salt for a sufficient period of time to secure the desired exchange and penetration of the larger atomic diameter alkali metal into the surface of the base glass. To effect this treatment, the alkali metal strengthening salt is placed in a suitable container, for example, stainless steel tanks, or other inert receptacle, and heated to a temperature at which it is molten. Usually the temperature of treatment will vary between the threshold temperature at which the alkali metal treating salt becomes molten and a temperature around the strain point of the base glass being strengthened, and any convenient treating temperature between the melting point of the alkali metal strengthening salt and the temperature at the glass strain point or slightly above can be used.

Prior to immersion of the base glass into the molten alkali metal salt treatment bath, the base glass article is preferably heated to a temperature within the range of 50° F. above or below the temperature at which the alkali metal exchange treatment is to be conducted, that is, the temperature at which the alkali metal salt is maintained during treatment. More preferably, the glass article is preheated to a temperature fairly close approximating that at which the exchange strengthening treatment is conducted.

In a typical method of performing this invention, the preheated base glass in sheet form is dipped into a molten bath of potassium nitrate maintained at a temperature of about 800° to 1100° F. and treated for a period of about 8 minutes to about 100 hours. This strengthening treatment causes introduction of potassium into the surface of the base glass by replacement of potassium for the sodium and other exchangeable smaller atomic diameter metals or other electropositive elements in the surface of the base glass at the time of treatment, thereby developing high surface compressive stress and load strength in the glass and depleting the sodium content at the surface.

The treated glass article is then removed from the molten potassium nitrate treating bath and cooled gradually to a temperature roughly approximating room temperature, that is, a temperature ranging from 200° F. down to and even below room temperature. Following cooling, the glass is usually subjected to aqueous rinsing to remove excess treating salt.

Instead of a potassium treating salt, a molten cesium or rubidium salt, for example, rubidium or cesium nitrate, can be employed for strengthening the base glass. In such a case, the rubidium and cesium from the treating salt exchanges for the sodium and potassium, each being a smaller atomic diameter alkali metal than rubidium and cesium, thereby incorporating rubidium or cesium into the surface of the base glass to produce rubidium or cesium exchange strengthened glass. Obviously, mixed salt ion exchange treating baths could be used such as mixed molten potassium and cesium salt baths.

The alkali metal salt used for the strengthening treatment should be fairly stable at the treatment temperatures employed. Typically, satisfactory salts are those of the mineral acids, such as sulfates, nitrates, chlorides, fluorides and phosphates of potassium, cesium and rubidium, which are low in alkalinity and do not seriously deface or etch the base glass article.

The foregoing discussion has related to employing a single larger atomic diameter alkali metal exchange strengthening treatment, and for most purposes, a single exchange treatment is widely satisfactory to secure the desired results. However, it is also within the purview of this invention to strengthen the $SiO_2$—$Na_2O$—$Al_2O_3$—alkaline earth metal oxide-$ZrO_2$ glass by subjecting it to a series of alkali metal salt exchange treatments. In such similarly conducted experiments, each successive treatment is conducted using an alkali metal salt having a larger atomic diameter than the alkali metal employed for a prior exchange strengthening treatment. Such successive later exchange treatment or treatments, all of which are preferably conducted at temperatures below the glass strain point, can serve to increase the magnitude of surface compressive stress and even thickness of the surface compressive stress zone.

For example, the base glass can be subjected first to potassium exchange strengthening treatment, using molten potassium nitrate treating salts, followed by a further alkali metal strengthening treatment using a molten salt of an alkali metal having an atomic diameter larger than potassium, for example, a molten rubidium salt, such as molten rubidium nitrate. The effect of the second alkali metal strengthening treatment is to deplete the potassium and other available exchangeable lower atomic diameter alkali metals at the surface of the glass, thus replacing them with rubidium. By this means the magnitude of the compressive stress at the surface of the glass and hence its load strength can be increased. Moreover, if desired, the sodium-potassium exchange strengthened glass can be subjected to further successive alkali metal exchange treatments using first rubidium and then a cesium salt, respectively.

Usually when strengthening the base glass compositions by the use of such successive alkali metal salts exchange strengthening treatments, the glass is cooled between each exchange treatment to a temperature ranging from 200° F. down to and even below room temperature. Following cooling, the glass is usually subjected to aqueous rinsing or to other cleansing prior to subsequent exchange treatments to remove excess treating salts. The glass is then preheated prior to a subsequent exchange treatment or treatments.

However, it is also within the purview of the present invention to avoid the loss in time and thermal energy required in cooling the glass to room temperature between exchange treatments, and then preheating the glass to temperatures approximating those at which the subsequent exchange treatment or treatments are to be conducted, by cleansing the glass without first cooling to room temperature by impinging the flowing preheated air or other inert gases (which have been preheated to the treatment temperature to be employed in the subsequent exchange treatment) upon a surface of the treated glass, thereby serving to remove excess molten treating salts. Instead of gases, absorbing clays or silica powders can be employed for high temperature cleansing and these materials can serve to absorb excess molten salt.

While the various above-mentioned exchange strengthening treatments can be conducted effectively by immersion of the base glass in a molten salt of a larger atomic diameter alkali metal salt, other methods of contact can be used. For example, the base glass can be sprayed or otherwise provided with an adhering coating of the potassium and the coated glass can be heated to a temperature at which the potassium salt is molten to effect a non-immersion exchange strengthening.

Furthermore, the alkali metal treating salt can be mixed with a coherent, inert carrier or diluent, for example, thixotropic clay, to form a paste which is adherent to the glass and the paste, then applied to the glass prior to or simultaneously with or even shortly after heating the glass to treatment temperatures. The paste should usually contain from about 15 to 80 percent by weight of alkali metal salt to achieve non-immersion exchange strengthening within reasonably rapid treating periods.

The present invention can be employed to produce strengthened glass articles of all types, for example, sheet, wind screens, automobile windshields, side windows and back windows, building materials, architectural glass or spandrels, skylights, bottles, plates, casseroles, saucers, cups, bowls and other tableware, drinking glasses and goblets, viewing closures, such as window panes and glass doors, safety glass and other laminated viewing closures and structures, glass insulation structures wherein a plurality of glass sheets are arranged in spaced fashion with a layer of air or fluorocarbon serving as the insulation medium, television safety glass implosion and/or explosion shields, ophthalmic lenses for eye glasses, goggles, etc., glass roofs or transparent domes in vehicles and buildings, and experimental devices such as glass engine parts.

I claim:

1. In a method for strengthening an alkali metal silicate glass article in which sodium ions in the surface of the glass article are replaced by larger monovalent alkali metal ions by bringing the surface of the glass article into contact with the source of said larger monovalent alkali metal ions so as to place a compression layer in the surface of the glass article, the improvement which comprises forming the article to be strengthened from an alkali metal oxide-zirconia-aluminosilicate glass consisting essentially by weight on the oxide basis of about:

| Component | Percent by Weight |
|---|---|
| $SiO_2$ | [50–58] 52–57 |
| $Na_2O$ | [8–23] 10–19 |
| $K_2O$ | [0–15] 0–10 |
| $Na_2O + K_2O$ | [13–25] 17–23 |
| $Al_2O_3$ | [7–17] 9–13 |
| $ZrO_2$ | [1–4.5] 2–4.5 |
| $Al_2O_3 + ZrO_2$ | [10–21] 12–17 |
| [CaO] | [0–10] |
| MgO | [0–6.5] 4–6 |
| [CaO + MgO] | [2.5–10] |
| $TiO_2$ | [0–7] 1–6 |
| [$TiO_2$ + (MgO + CaO)] | [4–14] | wherein the glass includes less than 0.1 percent by weight $Li_2O$ and the above components constitute at least 95 percent by weight of the glass composition and are proportioned relative to one another so as to provide glass having a viscosity of 100 poises at a temperature less than 2800° F. and a viscosity of 10,000 poises at a temperature less than 2050° F. and having a working range of at least 125° F.

2. A chemically strengthened glass article exhibiting a surface compressive stress after being subjected to surface abrasion composed of an interior portion which is in tension and a surface compressive layer, said interior portion comprising a base glass consisting essentially by weight on the oxide basis of about:

| Component | Percent by Weight |
|---|---|
| $SiO_2$ | [50–58] 52–57 |
| $Na_2O$ | [8–23] 10–19 |
| $K_2O$ | [0–15] 0–10 |
| $Na_2O + K_2O$ | [13–25] 17–23 |
| $Al_2O_3$ | [7–17] 9–13 |
| $ZrO_2$ | [1–4.5] 2–4.5 |
| $Al_2O_3 + ZrO_2$ | [10–21] 12–17 |
| [CaO] | [0–10] |
| MgO | [0–6.5] 4–6 |
| [CaO + MgO] | [2.5–10] |
| $TiO_2$ | [0–7] 1–6 |
| [$TiO_2$ + (MgO + CaO)] | [4–14] | wherein the glass includes less than 0.1 percent by weight $Li_2O$ and the above components constitute at least 95 percent by weight of the base glass composition and are proportioned relative to one another so as to provide a base glass having a viscosity of 100 poises at a temperature less than 2800° F. and a viscosity of 10,000 poises at a temperature less than 2050° F., and having a working range of at least 125° F.; said surface layer having a composition chemically altered from that of the base glass to the extent that the surface layer has a lesser content of sodium with a correspondingly greater content on an ionic basis of a monovalent alkali metal ion having a larger ionic diameter than sodium.

* * * * *

UNITED STATES PATENT AND TRADEMARK OFFICE
CERTIFICATE OF CORRECTION

PATENT NO. : 4,015,045

DATED : March 29, 1977

INVENTOR(S) : Dale W. Rinehart

It is certified that error appears in the above-identified patent and that said Letters Patent are hereby corrected as shown below:

Column 1, line 62, ". In" should be --in--.

Table I, line 7, "215" should be --2157--.

Table I, line 14, "30" should be --80--.

Column 10, line 57, "is" (first occurrence) should be --it--.

Column 11, line 16, "LiO$_2$" should be --Li$_2$O--.

Table V, footnote 1, "compressed" should be --compression--.

Signed and Sealed this nineteenth Day of July 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 4,015,045          Dated March 29, 1977

Inventor(s) Dale W. Rinehart

It is certified that error appears in the above-identified patent and that said Letters Patent are hereby corrected as shown below:

Column 23, in the table between lines 20 and 30, the bracketed material should be deleted so that the composition appears as follows:

| | |
|---|---|
| $SiO_2$ | 52-57 |
| $Na_2O$ | 10-19 |
| $K_2O$ | 0-10 |
| $Na_2O + K_2O$ | 17-23 |
| $Al_2O_3$ | 9-13 |
| $ZrO_2$ | 2-4.5 |
| $Al_2O_3 + ZrO_2$ | 12-17 |
| $MgO$ | 4-6 |
| $TiO_2$ | 1-6 |

UNITED STATES PATENT OFFICE
CERTIFICATE OF CORRECTION

Patent No. 4,015,045                     Dated March 29, 1977

Inventor(s) Dale W. Rinehart

It is certified that error appears in the above-identified patent and that said Letters Patent are hereby corrected as shown below:

Likewise, in column 24, in the table between lines 10 and 20, the bracketed material should be deleted so that the composition appears as follows:

| | |
|---|---|
| $SiO_2$ | 52-57 |
| $Na_2O$ | 10-19 |
| $K_2O$ | 0-10 |
| $Na_2O + K_2O$ | 17-23 |
| $Al_2O_3$ | 9-13 |
| $ZrO_2$ | 2-4.5 |
| $Al_2O_3 + ZrO_2$ | 12-17 |
| MgO | 4-6 |
| $TiO_2$ | 1-6 |

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*